Patented Apr. 23, 1940

2,198,378

UNITED STATES PATENT OFFICE 2,198,378

SYNTHETIC RESIN AND CERTAIN USES THEREFOR

Carleton Ellis, Montclair, N. J., assignor to Ellis-Foster Company, a corporation of New Jersey No Drawing. Application October 24, 1936, Serial No. 107,359

8 Claims. (Cl. 210—24)

This invention relates to the manufacture of a particular type of resins from naturally occurring compounds containing phenolic groupings, particularly those derived from plant life. As examples of these materials may be mentioned those tannins, dyes, and resins obtained from *Aspidosperma quebracho, Chlorophora tinctoria, Manchuria tinctoria, Acacia catechu, Rhizophora mangle,* various species of *Xanthoria* and *Haematoxylum campechanum* and the toxic principles of *Rhus toxicadendron* and *Rhus vernicifera*.

Such substances provide an abundant and cheap source of phenols which may be used in the synthesis of a variety of useful products.

For example, a cheap thermosetting molding composition may be prepared from quebracho tanning extract. This material is marketed as a 35 per cent liquid extract and a 70 per cent water soluble solid. A molding composition may be prepared by the varnish method using the liquid extract, but it is preferable to use the solid powdered extract because the step of drying the composition is then eliminated. Although the extract is thermosetting in itself, it is advisable to use hexa. Thus 50 parts (which may or may not include phenol itself or other supplemental or auxiliary phenolic bodies) of quebracho extract, solid, 50 to 100 parts of wood flour and 10 to 25 parts of hexamethylenetetramine are thoroughly ground together in a ball mill. The composition may be hot pressed at the conditions usually pertaining to phenolic molding compositions. The products obtained are hard, glossy and water resistant. By using the quebracho extract-hexamethylenetetramine combination, a binder for wood scrap, sawdust, and the like may be had, and the whole pressed into sheets to form a wood substitute.

A unique product may be obtained by making use of the phenols occurring in poison ivy. The toxic principle of the sap of poison ivy is analogous to that of Japanese lac. To make technical use of such material the leaves and stems of the poison ivy plant may be steeped in weak alkaline solution and the solution so obtained decanted from spent leaves and stems. Upon acidifying this extract, a slight precipitate is obtained which is difficultly filterable. The acidified extract is reacted with formaldehyde and the resulting precipitate filtered off and dried. This dark-colored product may be used as a type of base exchange material. For instance, when a solution of a lead salt is passed through, the lead is taken up by the resin and may be recovered by titurating with a weak acetic acid solution. Another material which may be removed from water solution by this resin is gold. Upwards of 0.2 of a gram of gold chloride is absorbed per cubic centimeter of the condensation product of the juice or sap of poison ivy.

As Adams and Holmes have shown in a recent article (Journal of the Society of Chemical Industry, 1935, 1T—6T), certain tannins may be resinified with formaldehyde and used as base exchange materials. Quebracho extract is perhaps the most suitable for this purpose. A feature of this invention consists of coating zeolitic particles with the quebracho resin. Inasmuch as the quebracho formaldehyde product is insoluble, it is best to precipitate the resin directly on the particle. To this end the zeolite granules may be mixed with a concentrated solution of the quebracho extract and dried. The coated granules may then be sprinkled into boiling acidified formaldehyde with the result that the insoluble resin is quickly formed on the granules.

Although the zeolite is one which is capable of removing hardness from water before coating the initial coated material may not do this. Hence it may be necessary to activate this product, for instance, by treatment with sodium chloride, before any calcium may be absorbed.

Another feature of this invention is the transformation of base exchange materials, particularly a quebracho formaldehyde resin, into substances which will remove acid groups, that is, anions from solution. In order to do this, the resin is saturated or substantially saturated with a metal (solution of a metal salt) capable of forming insoluble salts. Metals which may be suitable are lead, nickel, aluminum, bismuth or tin. The compounds of resin (of the types described) with metals of the type lead, nickel, aluminum, bismuth and tin, will hereinafter be termed "metal adduct" which term is not herein used to cover products of the reaction of the resin with metals of the alkalies or alkaline earths, which form a different type of addition product. A great fault of the zeolite process of softening water is that it does not remove the bicarbonate anion from the treated water. As a result bicarbonate salts (e. g. $NaHCO_3$) left in the softened water, are decomposed in the boiler, sometimes causing embrittlement of the boiler tubes and corrosion of the steam lines. Such bicarbonate may be removed by treating the water with the product produced by acting upon a quebracho resin with, for example, lead acetate or aluminum sulphate and washing until the wash water runs off free from the cation. The lead or ninum (or similarly the nickel, bismuth or referred to above) will thereby be adsorbed [on] the resin, forming a compound with the resin, the exact nature of the compound formed [n]ot be now stated. Upon passing a solution [of s]odium bicarbonate through a lead "adduct" [t]he resin, the sodium replaces the lead which forms an insoluble salt with the bicarbonate In order to regenerate the composition a dilute solution of acetic acid may be run through [o]therwise contacted until a test for lead is [obta]ined in the effluent, whereupon fresh bicar[bon]ate-containing water may be again subjected [to li]ke treatment.

[Th]e following examples are illustrative of the [inve]ntion.

*Example 1.*—50 parts by weight of solid que[brac]ho extract containing 70 per cent tannins [were] ground in a ball mill with 50 g. wood flour [and] 10 g. of hexamethylenetetramine. The re[sulti]ng powder was molded at 175° C., 2000 [poun]ds per square inch, for 5 minutes. The [mol]dings were dark brown, glossy, well formed, [and] apparently well cured.

*Example 2.*—A quantity (about 1½ kilos) of [the] stems and leaves of the poison ivy plant were [boil]ed in 10 liters of 5 per cent sodium hydroxide [solu]tion and brought to a boil. The material was [allo]wed to stand overnight when the extract, a [very] dark brown liquid, was filtered off. A sam[ple] of the diluted extract when acidified and [tes]ted with ferric chloride developed a dark [gree]n color. Another sample of the alkaline solu[tion] boiled with formaldehyde produced no pre[cipit]ate. Another sample of the extract, acidified [and] boiled with formaldehyde, produced a floc[cule]nt precipitate. An acidified sample of the [extr]act boiled without formaldehyde became tur[bid, ]but the precipitate did not settle out.

[On] the basis of these observations, the re[main]der (substantially the whole) of the extract [was] acidified with hydrochloric acid and boiled [with] 8 liters of 37 per cent formaldehyde. A [res]ike precipitate was filtered off and dried at [86°] C. in vacuo. The dried material was placed [in a] glass tube 2 cm. in diameter to form a col[umn] of resin 10 cm. high. A solution containing [5 ]g. of lead acetate per 100 cc. was allowed to [flow] therethrough. The effluent was tested for [lead] with ammonium sulphide. Five hundred [cubi]c centimeters of the solution were passed [thro]ugh before a test showed the presence of [lead] salt in the effluent. On treating the resin [in th]e column with a 5 per cent solution of acetic [acid] the lead was substantially completely re[mov]ed. The so-regenerated material was then [test]ed with a solution of gold chloride contain[ing ]1 mg. of gold per cc. More than 6 liters of [solut]ion were passed through before a sample of [the ]effluent would give a test for gold (Cassius [pur]ple).

*Example 3.*—A 50 per cent solution of the solid [queb]racho extract was mixed with a glauconite [zeoli]te until a thick paste was obtained. After [dryi]ng it was found that each granule was coated [with] the quebracho tannin. The granules were [spri]nkled into rapidly boiling acidified 37 per [cent ]formaldehyde solution in water. In this [way ]the quebracho was resinified and each zeolite [parti]cle was coated with the quebracho resin. [It w]as again dried, washed with distilled water, [and ]packed into a glass tube 2 cm. in diameter [to fo]rm a column 10 cm. high. On passing a [solut]ion of calcium sulphate containing 406 [p. p.]m. hardness (calculated as calcium carbonate) through the column, no calcium was removed. It was, therefore, treated with a 10 per cent solution of sodium chloride and washed again with distilled water. On further treatment with the hard water, 500 cc. were passed through before a test for calcium was obtained with standard soap solution.

*Example 4.*—One part by weight of quebracho extract containing 70 per cent tannins, 2 parts 37 per cent formalin and 5 to 10 parts by weight of water were heated to boiling. One-half part by weight of concentrated hydrochloric acid was added and heating was continued until gelation took place. The gel was dried at 86° C. in vacuo and ground to pass through 40 mesh over 60 mesh screens. The ground resin was washed with distilled water by decantation to remove semi-colloidal fines and then placed in a 2 cm. glass tube to form a column 10 cm. high. A 5 per cent solution of lead acetate was run through the column which was washed with distilled water until no lead appeared in the effluent. It was then tested with a solution of sodium bicarbonate containing 1.1 mg. of bicarbonate ion per cc. The second 50 cc. portion passing through showed a substantial amount of bicarbonate.

The material was regenerated with 5 per cent acetic acid until the lead started to dissolve and appear in the effluent. After washing free of acid the column was again tested with the bicarbonate solution and this time 150 cc. were treated. After again regenerating with acetic acid and washing, 250 cc. of bicarbonate-containing water were treated.

*Example 5.*—Example 4 was repeated using nickel sulphate and aluminum sulphate in place of the lead acetate. The results were substantially the same.

What I claim is:

1. A process of removing the bicarbonate anion from water containing same, which comprises contacting such water with a metal adduct of a phenolic-formaldehyde resin, the metal in the metal adduct being selected from the group consisting of lead, nickel, aluminum, bismuth and tin, the phenolic constituent of the resin being a polyhydric phenol.

2. A process of removing bicarbonate anion from water containing same which comprises contacting such water with an insoluble resin formed from a polyhydric phenol and formaldehyde, which resin contains an adsorbed metal selected from the group consisting of lead, nickel, aluminum, bismuth and tin, in combination with said resin.

3. A process of removing bicarbonate anion from water containing same which comprises contacting such water with an insoluble resin formed from poison ivy extract and formaldehyde, which resin contains an adsorbed metal selected from the group consisting of lead, nickel, aluminum, bismuth and tin, in combination with said resin.

4. A process of removing bicarbonate ion from water containing the same which comprises contacting such water with a purifying material which comprises a lead adduct of a quebracho-formaldehyde resin.

5. A process of removing bicarbonate ion from water containing the same which comprises contacting such water with a purifying material which comprises a metal adduct of a phenolic-formaldehyde resin, the metal of said adduct being selected from the group consisting of lead, nickel, aluminum, bismuth and tin, and the phenol of said resin being selected from the group consisting of the phenol of quebracho and the phenol of poison ivy.

6. A process of removing both the cation and the anion of calcium bicarbonate from water containing same in solution, which comprises contacting such water with a water softener comprising a metal adduct of a resin deposited on granules of a base exchange zeolite, said resin being a condensation of a polyhydric phenol with formaldehyde, and such adduct containing an adsorbed metal selected from the group consisting of lead, nickel, aluminum, bismuth and tin, combined with said resin.

7. A process of removing both the cation and the anion of calcium bicarbonate from water containing same in solution, which comprises contacting such water with a water softener comprising a metal adduct of a resin deposited on granules of a base exchange zeolite, said resin being a condensation product of the phenolic constituent of poison ivy with formaldehyde, and such adduct containing an adsorbed metal selected from the group consisting of lead, nickel, aluminum, bismuth and tin, combined with said resin.

8. A process of purifying water containing temporary hardness which comprises contacting such water with a phenolic-formaldehyde resin the phenolic constituent of which resin is the phenolic constituent extracted from the poison ivy plant.

CARLETON ELLIS.